3,015,546
GASOLINES INHIBITED AGAINST THE FORMATION OF DEPOSITS, SLUDGE AND VARNISH
Adlai E. Michaels, Cranford, N.J., and Antony Winward, Wantage, England, assignors to Esso Research and Engineering Company, a corporation of Delaware
No Drawing. Filed Oct. 28, 1958, Ser. No. 769,991
16 Claims. (Cl. 44—62)

The present invention relates to improved fuels for use in internal combustion engines and more particularly relates to gasolines having incorporated therein certain polymeric additive agents which markedly reduce the formation of deposits, sludge and varnish in gasoline engines.

Despite the relatively high efficieny of modern gasoline engines, complete combustion of the fuel introduced into the combustion chambers of such engines seldom if ever occurs. Studies have shown that certain polynuclear aromatic compounds and other relatively high boiling materials present in gasolines are only partially burned and that the exhaust gases formed in the combustion chambers of gasoline engines contain trace amounts of hydrocarbons. Apparently these hydrocarbons undergo complex cracking, polymerization and oxidation reactions to form carbonaceous deposits which adhere to the upper part of the cylinder head, the valves, the piston tops and other surfaces in the engine with which the hot gases come into contact. Some of the carbonaceous products thus formed also appear to be blown past the piston rings into the crank case of the engine where they dissolve in the lubricating oil. When the lubricating oil subsequently comes into contact with hot metal surfaces, these dissolved materials react to form insoluble products. It has been shown that practically all the sludge in crankcase oils and most of the varnish on piston skirts, connecting rods, crankshafts and similar engine parts are thus due to constituents which were originally present in the gasoline.

Deposits, sludge and varnish formed in this manner seriously affect the operation of a gasoline engine. The role which combustion chamber deposits play in promoting surface ignition, spark plug fouling, rumble, octane requirement increase and similar combustion difficulties is generally well known. Less familiar but equally serious is the tendency of these foreign materials to cause malfunctioning of the engine lubricating system, to accelerate the rate at which the wear of engine parts occurs, to increase engine oil consumption, and to produce improper valve and piston ring operation, leading to serious losses in engine power. Because of these adverse effects, efforts have been made to improve the combustion in gasoline engines and decrease the formation of deposits, sludge and varnish by a variety of methods, including the use of solvent oils and other additives in the gasoline.

The present invention provides a class of new and improved additive agents which are manifestly superior to additives employed in gasolines in the past in order to reduce the formation of engine deposits, crankcase sludge and varnish. In accordance with the invention it has now been found that the addition of certain selected tripolymers to gasolines greatly improves engine cleanliness without leading to the formation of harmful combustion chamber deposits, permits economies in engine operation generally unattainable heretofore, and obviates the necessity for certain costly refinery processing steps which were often applied to gasolines in the past in order to improve their engine cleanliness properties.

The tripolymers which are employed as gasoline additives in order to reduce the formation of engine deposits, sludge and varnish in accordance with the invention are tripolymers prepared by the copolymerization of a long chain aliphatic ester of an unsaturated, conjugated dibasic acid, a vinyl ester of a short chain fatty acid and an N-vinyl amide. Although the mechanism by which these tripolymers act to reduce the formation of deposits, sludge and varnish in gasoline engines is not fully understood, it has been found that the use of a monomer from each of these three particular classes in preparing the polymer is essential in order to obtain the desired results.

The long chain aliphatic esters of unsaturated conjugated dibasic acids which are employed as one of the monomers in producing the additive agents employed in accordance with the invention are esters of $C_4$ to $C_5$ unsaturated conjugated dibasic acids. Examples of acids which may be esterified to produce such esters include maleic acid, fumaric acid, citraconic acid, mesaconic acid, glutaconic acid, itaconic acid and the like. Esters of the butenedioic acids, fumaric acid and maleic acid and mixtures of the two, are preferred for purposes of the invention.

Long chain aliphatic esters of the above acids may be prepared by reacting the acids with aliphatic alcohols containing from about 8 to about 24 carbon atoms per molecule. Saturated aliphatic alcohols containing from about 8 to 18 carbon atoms per molecule are preferred for use in preparing the esters. Saturated straight chain alcohols of from 10 to 12 carbon atoms per molecule are particularly effective for purposes of the invention. Mixed esters derived by the reaction of the acids with a mixture of alcohols may be used. Examples of alcohols suitable for use in producing the esters include straight chain primary alcohols such as octyl, decyl, lauryl, cetyl, stearyl, eicosyl and docosyl alcohols; branched alcohols such as 2-ethylhexanol-1, 2,4,5,7-tetramethyl octanol-1, and $C_8$-oxo alcohols; secondary alcohols such as nonanol-5; and the like.

Commercially marketed mixtures of alcohols consisting essentially of saturated alcohols of the requisite chain length may be employed in preparing the long chain esters. One such mixture is prepared by the hydrogenation of coconut oil and is marketed under the trade name "Lorol." This mixture of alcohols consists primarily of lauryl alcohol but contains compounds of from 10 to 18 carbon atoms per molecule. It has the following approximate composition.

| Number of carbon atoms: | Weight percent |
|---|---|
| $C_{10}$ | 4.0 |
| $C_{12}$ | 55.5 |
| $C_{14}$ | 22.5 |
| $C_{16}$ | 14.0 |
| $C_{18}$ | 4.0 |

Tallow alcohol is a similar mixed product consisting primarily of cetyl and stearyl alcohols derived from tallow fat by hydrogenation. Other mixtures available commercially are derived from soy bean oil and similar natural products and also have chain lengths within the range recited above.

$C_8$-oxo alcohols may also be employed in preparing the long chain esters of unsaturated conjugated dibasic acids used as monomers in preparing the tripolymers. These alcohols are derived through the oxonation and hydrogenation of a $C_7$ copolymer of propylene and butene and generally will have the following analysis:

STRUCTURE OF $C_8$ OXO-ALCOHOL PREPARED FROM $C_2$-$C_4$ COPOLYMER HEPTENES

| Constituent | Percent |
|---|---|
| C—C—C—C—C—C—OH (with C,C branches) | 29 |
| C—C—C—C—C—C—OH (with C,C branches) | 25 |
| C—C—C—C—C—C—OH (with C,C branches) | 17 |
| C—C—C—C—C—C—OH (with C branch) | 16 |
| C—C—C—C—C—C—OH (with C branch) | |
| C—C—C—C—C—OH (with C,C branches) | 2.3 |
| C—C—C—C—C—OH (with C,C branches) | 1.4 |
| 2-alkyl alkanols | 4.3 |
| Others | 5.0 |
| Total | 100.0 |

Higher molecular weight oxo-alcohols may also be employed in the preparation of the additives. These higher molecular weight alcohols are prepared in a manner similar to the method employed for the preparation of $C_8$-oxo alcohols and have compositions generally analogous to that set forth above. The chain lengths and degree of branching depend, of course, upon the particular olefins which are subjected to the oxonation and hydrogenation reactions.

Specific examples of long chain esters of unsaturated conjugated dibasic acids useful in preparing the tripolymer additives include lauryl fumarate, tallow fumarate, nonyl maleate, n-octyl citraconate, isooctyl maleate, $C_8$-oxo mesaconate, dodecyl citraconate, lauryl itaconate, "Lorol" fumarate, and the like. Lauryl fumarate, decyl fumarate, and similar fumarate esters prepared from straight chain saturated alcohols of from 10 to 12 carbon atoms per molecule are preferred.

The vinyl esters used as a monomer in preparing the tripolymer are vinyl esters of short chain fatty acids containing from about 2 to about 4 carbon atoms per molecule. Specific examples of such vinyl esters include vinyl acetate, vinyl propionate and vinyl butyrate.

The N-vinyl amides which are employed as the third constituent of the tripolymer are characterized by the following general formulae:

(I) 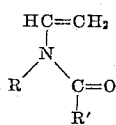

and (II) 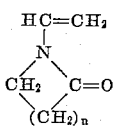

where, in Formula I, R is selected from the group consisting of hydrogen and alkyl groups of 1 to 18 carbon atoms and R' is an alkyl group of from 1 to 18 carbon atoms, and, in Formula II, $n$ is an integer from 2 to 4. Preferably R and R' are alkyl groups of 1 to 8 carbon atoms. Formula II given above represents compounds of Formula I wherein R and R' have been replaced by a single divalent hydrocarbon radical of from 2 to 5 carbon atoms to give an internal or cyclic amide. The cyclic compounds of Formula II above having a 5 member ring, N-vinyl pyrrolidone and derivatives thereof, have been found to be particularly effective for purposes of the invention and are preferred. Specific examples of N-vinyl amides having the above formulae include N-vinyl-N-methyl acetamide, N-vinyl oleamide, N-vinyl pyrrolidone, N-vinyl-N-isopropyl-2-ethyl hexoic amide, N-vinyl piperidone, N-vinyl-$\beta$-methyl pyrrolidone, and N-vinyl-$\epsilon$-valerolactam.

The monomers described in the preceding paragraphs are polymerized to produce the tripolymers useful in gasolines in accordance with the invention by mixing them in proportions of from about 25 to about 60 mol percent of the dicarboxylate, about 15 to about 65 mol percent of the vinyl ester, and about 5 to about 35 mol percent of the N-vinyl amide. Polymerization of the monomers in ratios of from about 42 to 50 mol percent of the fumarate, 35 to 45 mol percent of the vinyl ester and about 10 to 35 mol percent of the N-vinyl amide is preferred. The polymerization reaction may be carried out without diluent or in a solution of a paraffinic solvent such as heptane or white oil at a temperature in the range of from about 60° F. to about 250° F. and may be promoted by gamma radiation or by means of a peroxide type catalyst such as benzoyl peroxide, a hydroperoxide or an azo catalyst such as alpha-alpha'-azo-bis-iso-butyronitrile. It is generally preferred to carry out the polymerization reaction under a blanket of an inert gas such as nitrogen or carbon dioxide in order to exclude oxygen. The polymerization time may vary from about 1 to about 36 hours.

Polymerization of the monomers apparently proceeds between the unsaturated double bonds and the resulting polymer does not have a regular geometrical arrangement. The tripolymer may have a molecular weight in the range of from about 1000 to about 100,000 or higher but it is preferred to limit the polymerization so that a product having a molecular weight of from about 2000 to about 20,000 Staudinger is obtained. Upon completion of the polymerization reaction, the tripolymer may be recovered by boiling off the solvent.

The tripolymer thus prepared may be incorporated into gasolines in concentrations in the range of from about 0.001% to about 0.5% by weight. Concentrations in the range of from about 0.005% to about 0.2% are normally effective and therefore are preferred in those cases. The preferred method of incorporating the additive into gasoline is to employ a solvent such as xylene, a highly refined lubricating oil, a white oil or the like. The tripolymers may, however, be added directly to the fuel since they are soluble in gasoline at the concentrations in which they are used in accordance with the invention.

The gasolines in which the tripolymers are incorporated in order to reduce the formation of deposits, sludge and varnish are conventional fuels employed in internal combustion engines operating on the Otto cycle. They are supplied in a number of different grades depending upon the type of service for which they are intended. The tripolymer additives may be employed in all of these grades but are particularly useful in motor gasoline. Motor gasolines as referred to in connection with the present invention meet the requirements of ASTM Specification D-439-56T in types A, B and C. They are composed of a mixture of various types of hydrocarbons including aromatics, olefins, paraffins, isoparaffins, naphthenes and, occasionally, diolefins and are obtained from petroleum crude oil by refining processes such as fractional distillation, catalytic cracking, hydroforming, alkylation, isomerization and solvent extraction. Aviation gasolines have properties similar to those of motor gasoline but normally have a somewhat higher octane number. Their properties are set forth in Military Specification MIL-F-5572.

It will be understood that the additive of the invention may be employed in gasolines in conjunction with other additive agents conventionally used in such fuels. It is conventional practice to employ from about 2 to about 4.6 cc. of tetraethyl lead, tetramethyl lead or a similar alkyl lead anti-knock agent in both motor gasoline and aviation gasoline. Halogenated hydrocarbons and phosphorus esters are generally employed as scavenger agents in gasolines in concentrations ranging from about 1 to about 1.7 theories of the halogenated hydrocarbon and from about 0.05 to about 1.0 theory of the phosphorus esters, based on the stoichiometric equivalent of the lead content. Other additives employed include materials designed to stabilize tetraethyl lead and other anti-knock agents, solvent oils, rust and corrosion inhibitors, anti-icing agents, and dyes. The additives of the invention may be used in conjunction with a wide variety of such other additives.

The nature and objects of the invention are more fully illustrated by the following examples.

*Example 1*

Lauryl fumarate, vinyl acetate, and N-vinyl pyrrolidone were combined without diluent in the reaction vessel. The three monomeric constituents were employed in a mol ratio of 1.0/0.8/0.2. About 2.0 wt. percent of benzoyl peroxide was added to the reaction mixture as a catalyst. The reactants were then stirred while the temperature was raised to and maintained at about 176° F. The reaction vessel was kept blanketed with nitrogen. Late in the reaction to facilitate stirring about 10% of a highly refined mineral oil was added. The reaction product was further diluted with mineral oil, and unreacted vinyl acetate was removed under reduced pressure. The tripolymer product was obtained as a 48 wt. percent solution in highly refined mineral oil. Analysis showed that the tripolymer contained the amide grouping.

*Example 2*

The tripolymer additive prepared as described in the preceding example, i.e. a 48 wt. percent solution of polymer in oil, was added to a commercial gasoline in a concentration of 0.1% by weight. The base gasoline had 97 research octane number. When tested by ASTM method D–86, its distillation showed 50% off at 195° F. and a final boiling point of 397° F.

Samples of the base gasoline and samples of the same gasoline containing 0.1% of the tripolymer additive were separately employed in a sustained engine test designed to evaluate gasoline performance under varied operation conditions. A 1950 six cylinder Chevrolet engine attached to a dynamometer on a test stand was operated through the following repeated cycles for about 110 hours.

| Cycle | R.p.m. | Jacket Water Outlet Temp., °F. | Oil Sump Temp., °F. | Intake Air, °F. | Brake, H.P. | Air/Fuel Ratio | Cycle Duration, Hrs. |
|---|---|---|---|---|---|---|---|
| 1 | 500 | 115 | 115 | 70 | 0 | 9.5/1 | 1½ |
| 2 | 2,000 | 160 | 175 | 70 | 40 | 11.5/1 | 2 |
| 3 | 2,000 | 160 | 215 | 70 | 40 | 11.5/1 | 2 |

The engine was inspected and various parts were rated for sludge, deposits and varnish on a demerit scale ranging from zero to 100, zero indicating the presence of no deposits and 100 signifying that the particular part rated had the maximum amount of deposits it was capable of holding. The results of these tests are set forth in the following Table I.

TABLE I.—EFFECT OF TRIPOLYMER UPON ENGINE DEPOSITS, SLUDGE AND VARNISH

| | Base Gasoline | Base Gasoline+0.1% of Tripolymer [1] |
|---|---|---|
| Piston Skirt Varnish, Overall | 90.0 | 22.0 |
| Thrust Side | 91.7 | 30.8 |
| Anti-Thrust Side | 88.3 | 13.3 |
| Sludge, Overall | 8.9 | 1.9 |
| Cyl. Head Top | 10.0 | 2.5 |
| Rocker Arm Assembly | 7.5 | 0 |
| Rocker Arm Cover | 7.5 | 0 |
| Crankshaft | 5.0 | 0 |
| Timing Gear Cover | 15.0 | 2.5 |
| Push Rod Chamber | 10.0 | 0 |
| Push Rod Chamber Cover | 15.0 | 2.5 |
| Crankcase | 10.0 | 5.0 |

[1] The tripolymer employed was one containing lauryl fumarate, N-vinyl pyrrolidone and vinyl acetate in a mol ratio of 1.0 to 0.2 to 0.8, 48 wt. percent in mineral oil.

The test results set forth in the above table clearly demonstrate the surprising superiority of gasolines containing the tripolymer additives of the invention. It will be noted that the sludge and varnish produced when the engine was operated on the fuel containing the tripolymer were significantly lower than when the base gasoline was used. These improved results are particularly surprising in view of the fact that the tripolymers are essentially non-volatile and therefore must enter the combustion chamber by entrainment in the liquid phase rather than by vaporization.

In addition to the reduced piston skirt varnish and sludge reported above, inspections of the engine employed in the tests indicated that the tripolymer additives reduced oil consumption, improved carburetor operation, and resulted in increased power due to better valve operation.

*Example 3*

The tendencies of a high octane aviation gasoline to form deposits, sludge and varnish in aviation piston engines in which it is used are reduced by incorporating into the gasoline in a concentration of 0.2% by weight a tripolymer prepared by the copolymerization of 25 mol percent of $C_8$-oxo maleate, 50 mol percent of vinyl propionate and 25 mol percent of N-vinyl piperidone in the presence of gamma radiation.

*Example 4*

To a motor gasoline containing 3 cc. of tetraethyl lead, 1.0 theory of ethylene dichloride and 0.5 theory of ethylene dibromide is added a tripolymer of 50 mol percent of hexadecyl fumarate, 25 mol percent of vinyl butyrate, and 25 mol percent of N-vinyl oleamide.

What is claimed is:

1. A gasoline to which has been added from about 0.001 wt. percent to about 0.5 wt. percent of a tripolymer prepared by the copolymerization of from about 25 to about 60 mol percent of an ester of an unsubstituted $C_3$ to $C_{24}$ aliphatic alcohol and an unsaturated conjugated $C_4$ to $C_5$ dibasic acid, about 15 to 60 mol percent of a vinyl ester of a $C_2$ to $C_4$ fatty acid, and about 5 to 35 mol percent of an N-vinyl amide having the formula

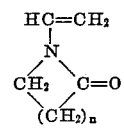

where $n$ is an integer from 2 to 4.

2. A gasoline composition as defined by claim 1 wherein said N-vinyl amide is N-vinyl pyrrolidone.

3. A gasoline composition as defined by claim 1 wherein said dibasic acid ester is a fumarate ester.

4. A gasoline composition as defined by claim 1 wherein said N-vinyl amide is N-vinyl piperidone.

5. A gasoline composition as defined by claim 1 wherein said tripolymer is present in a concentration of from about 0.005 wt. percent to about 0.2 wt. percent.

6. A gasoline having incorporated therein from about 0.001% to about 0.5% by weight of a tripolymer prepared by the copolymerization of from about 25 to about 60 mol percent of an ester of an unsubstituted $C_8$ to $C_{24}$ aliphatic alcohol and an unsaturated conjugated $C_4$ to $C_5$ dibasic acid, about 15 to 60 mol percent of a vinyl ester of a $C_2$ to $C_4$ fatty acid, and about 5 to 35 mol percent of an N-vinyl pyrrolidone.

7. A gasoline composition as defined by claim 6 wherein N-vinyl pyrrolidone is N-vinyl-β-methyl pyrrolidone.

8. A gasoline composition as defined by claim 6 wherein said fatty acid ester is vinyl acetate.

9. A gasoline composition as defined by claim 6 wherein said dibasic acid ester is lauryl fumarate.

10. A gasoline having incorporated therein from about 0.005 to about 0.2% by weight of a tripolymer prepared by the copolymerization of from about 40 to 50 mol percent of a $C_8$ to $C_{18}$ alkyl ester of fumaric acid, from about 35 to 45 mol percent of vinyl acetate, and from about 10 to 35 mol percent of N-vinyl pyrrolidone.

11. A gasoline having incorporated therein from about 0.005% to about 0.2% by weight of a tripolymer of from about 40 to 50 mol percent of lauryl fumarate, about 35 to 45 mol percent of vinyl acetate, and from about 10 to 35 mol percent of N-vinyl pyrrolidone.

12. A gasoline having incorporated therein a minor amount of a tripolymer, said tripolymer comprising of from about 25 to 60 mol percent of a long chain aliphatic ester composed of an unsaturated conjugated $C_4$ to $C_5$ dibasic acid and an unsubstituted $C_8$ to $C_{24}$ aliphatic alcohol; about 15 to 65 mol percent of a vinyl ester of a $C_2$ to $C_4$ fatty acid, and about 5 to 35 mol percent of an N-vinyl amide selected from the class consisting of those compounds having the formula (I) 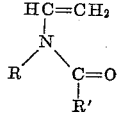

and (II) 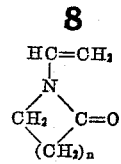

wherein R is selected from the group consisting of hydrogen and alkyl groups of 1 to 18 carbon atoms, R' is an alkyl group of from 1 to 18 carbon atoms, and $n$ is an integer from 2 to 4; the concentration of said tripolymer being sufficient to inhibit the formation of deposits, sludge and varnish in engines in which said gasoline is burned.

13. A gasoline composition as defined by claim 12 wherein said long chain aliphatic ester is an ester of a $C_4$ to $C_5$ dibasic acid and an unsubstituted $C_8$ to $C_{18}$ aliphatic alcohol.

14. A gasoline composition as defined in claim 12 wherein said tripolymer is present in a concentration of from about 0.001 weight percent to about 0.5 weight percent.

15. A gasoline having incorporated therein from about 0.001% to about 0.2% by weight of a tripolymer of about 25 mol percent of $C_8$-oxo maleate, 50 mol percent of vinyl propionate and 25 mol percent of N-vinyl piperidone.

16. A gasoline having incorporated therein from about 0.005% to about 0.2% by weight of a tripolymer of about 50 mol percent of hexadecyl fumarate, 25 mol percent of vinyl butyrate, and 25 mol percent of N-vinyl oleamide.

References Cited in the file of this patent

UNITED STATES PATENTS 2,800,452    Bondi et al.    July 23, 1957

FOREIGN PATENTS 758,203    Great Britain    Oct. 3, 1956
760,554    Great Britain    Oct. 31, 1956